United States Patent [19]

Carré et al.

[11] 4,365,844
[45] Dec. 28, 1982

[54] BRAKING CORRECTING VALVE FOR A DUAL BRAKING CIRCUIT

[75] Inventors: Jean J. Carré, Le Raincy; Christian Riquart, Paris, both of France

[73] Assignee: Societe Anonyme D.B.A., Paris, France

[21] Appl. No.: 226,309

[22] Filed: Jan. 19, 1981

[30] Foreign Application Priority Data

Jan. 30, 1980 [FR] France ................... 80 02015

[51] Int. Cl.³ .................... B60T 8/26; B60T 11/34; B60T 17/18
[52] U.S. Cl. ..................... 303/6 C; 188/349
[58] Field of Search ............ 303/6, 22, 84, 52; 188/349, 195, 345

[56] References Cited

U.S. PATENT DOCUMENTS

| | | | |
|---|---|---|---|
| 3,702,207 | 11/1972 | Armstrong | 303/22 A |
| 3,958,838 | 5/1976 | Totschnig | 303/22 R |
| 4,053,185 | 10/1977 | Carre | 303/6 C |
| 4,101,176 | 7/1978 | Carre et al. | 303/22 R X |
| 4,203,627 | 5/1980 | Kono | 303/6 C |
| 4,299,426 | 11/1981 | Hales et al. | 303/6 C |

Primary Examiner—Douglas C. Butler
Attorney, Agent, or Firm—Paul David Schoenle; Ken C. Decker

[57] ABSTRACT

The correcting valve comprises two identical parallel pistons which control the opening or closing of two valves which are disposed between two inputs and two outputs of two braking circuits. Two thrust members which are subjected to a control pressure urge the pistons in the direction for opening the valves. Two reaction springs co-operate with two transmission members for urging the thrust members in the opposite direction. When the two brakes circuits are supplied, the correcting valve has an identical cut-off pressure for the two circuits. In the event of failure of one of the circuits, the transmission members come into mutual engagement, resulting in a doubling in the cut-off pressure in the circuit which is still intact. The invention is used for dual-circuit braking systems for motor vehicles.

7 Claims, 2 Drawing Figures

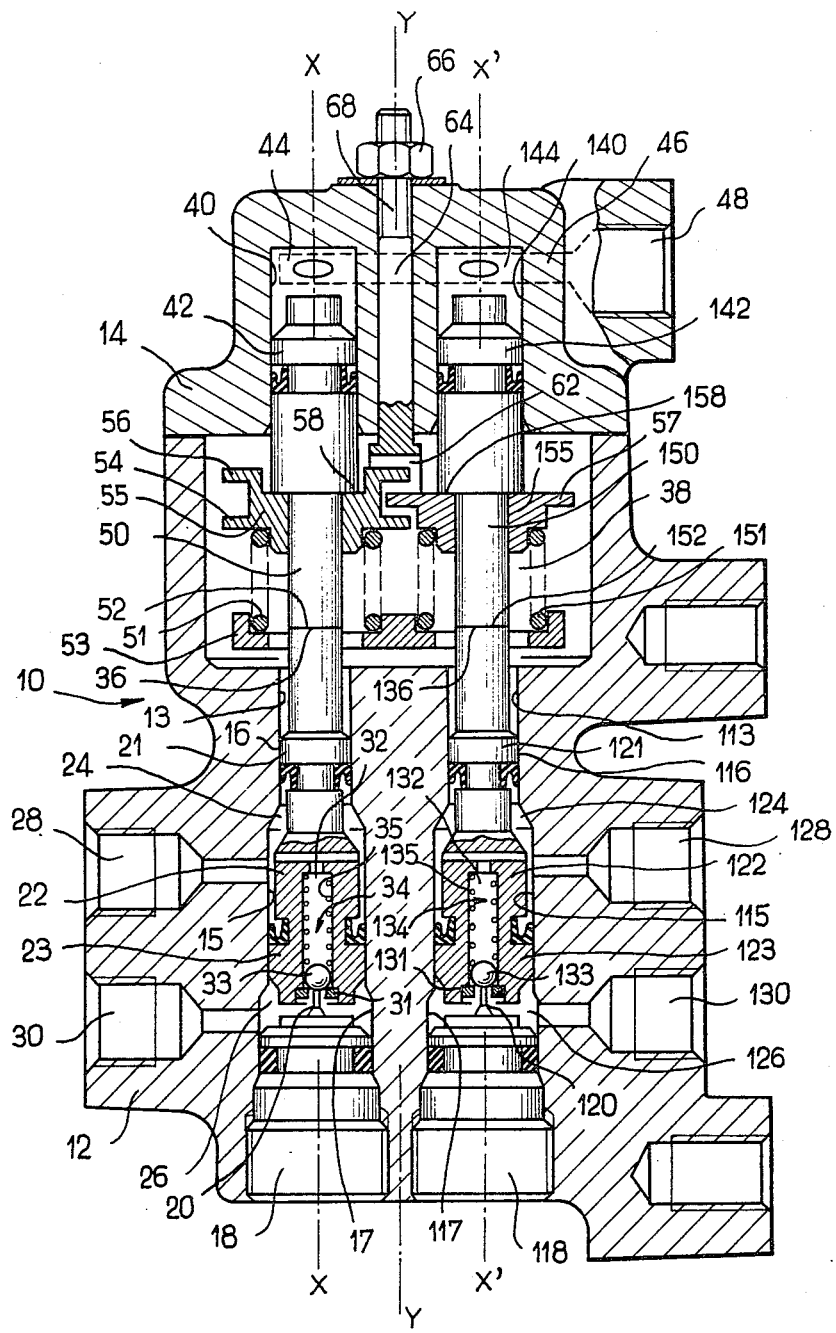
FIG_1

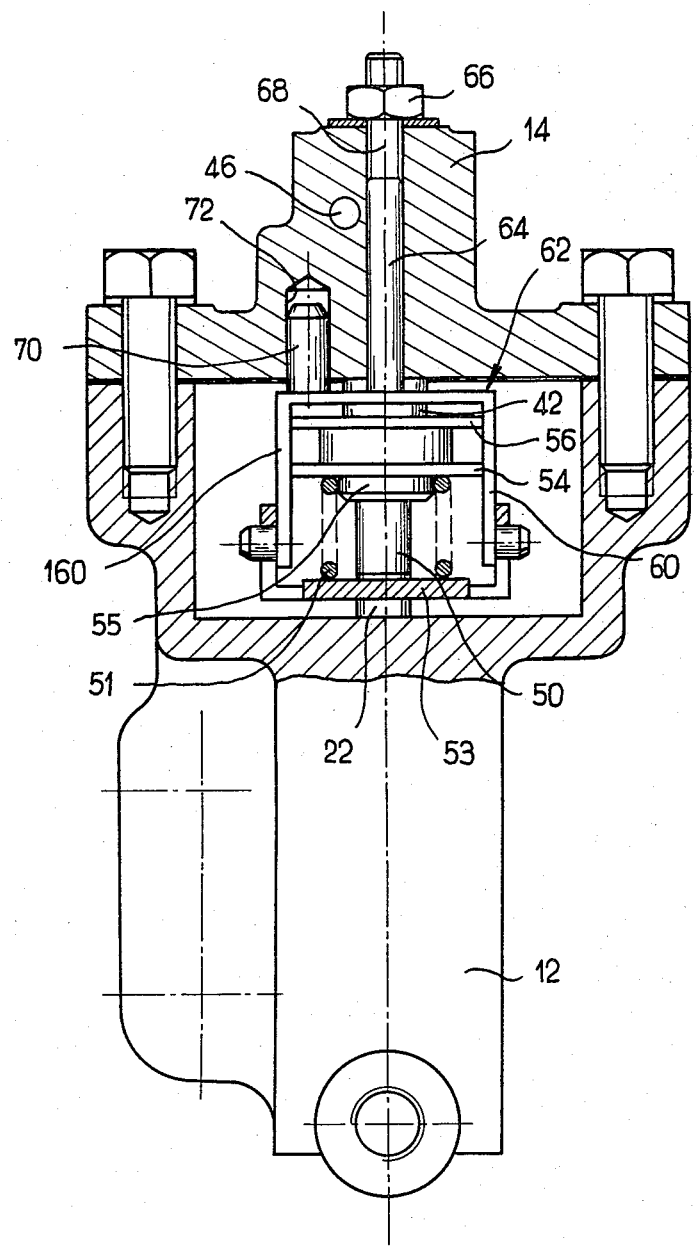
FIG_2

BRAKING CORRECTING VALVE FOR A DUAL BRAKING CIRCUIT

The invention relates to braking correcting valves for motor vehicle dual braking circuits, which are intended in particular for braking circuits which are referred to as being of the "X" configuration wherein two sources of pressure fluid, for example the two chambers of a tandem master-cylinder, each supplies fluid to a brake actuator associated with a front wheel on one side of the vehicle and a brake actuator associated with a rear wheel on the other side of the vehicle. These correcting valves are intended to limit and/or reduce the pressure admitted to the rear brake actuators when the pressure delivered by the master-cylinder exceeds a pressure which is referred to as the cut-off pressure, which is determined by the characteristics of the correcting valve. A valve of this kind is described in U.S. Pat. No. 4,101,176.

In the event of failure of one of the circuits, a serious problem arises when the cut-off pressure is to be carried over into the circuit which is still intact; indeed, in such a case, as the braking capacity is virtually reduced to half, it is necessary for the rear brake actuator associated with the intact circuit to admit a higher braking pressure.

For this purpose, the present invention proposes a braking correcting valve for a motor vehicle dual braking circuit comprising: a body, two parallel bores in said body defining between them an axis of symmetry, each of said bores communicating with a corresponding inlet port and outlet port, two pistons slideable in said bores, each of said pistons controlling the movements of a valve member for controlling the flow of a pressure fluid between one of said inlet ports and the outlet port corresponding thereto, each of said pistons having an end portion which projects outwardly of said body, and a distributor assembly which is capable of generating, from an actuating force, two pilot forces acting on said end portions to urge the pistons inwardly of the body in the direction of establishing said flow of fluid, said pressure fluid urging the pistons outwardly of the body in the direction of interrupting the flow of fluid, characterised in that said distributor assembly comprises: a cover which is fixed with respect to said body, two thrust members which are slideable in said cover parallel to said pistons and capable of coming into abutment with the end portions of said pistons, dividing means for dividing said actuating force into two equal actuating half-forces which are each applied to one of the two thrust members for urging said pistons inwardly of said body, resilient means for producing a reaction force opposed to said actuating half-forces, and a transmission assembly for distributing said reaction force in the form of two reaction half-forces each applied to one of said thrust members, whereby each thrust member is subjected to two opposite forces: an actuating half-force and a reaction half-force, the resultant of which constitutes said pilot force, said transmission assembly comprising two transmission elements which are fixed with respect to each of said thrust members, one of said transmission elements comprising two axially separated radial projections and the other of said transmission elements comprising a radial projection which projects between the radial projections of the first transmission element and being capable of coming into engagement with one of said two radial projections when the relative axial displacement between the two pistons exceeds a predetermined value.

It will be noted that the invention makes it possible to double the "cutoff" pressure of one of the circuits, in the event of a failure in the other circuit. Indeed, in that case, only the piston associated with the intact circuit is capable of moving against the pilot force produced by the corresponding thrust member. As will be described in detail in the following description, it follows from this that the two transmission members come into mutual contact, the two pilot forces then acting jointly on the piston associated with the intact circuit, resulting in doubling of the "cut-off" pressure of that circuit.

In accordance with another feature, the thrust members of the correcting means are subjected to a fluid pressure from the hydraulic suspension circuit of the vehicle, when the vehicle has such a suspension circuit.

This makes it possible for the mode of operation of the correcting means to be controlled in a simple manner as a function of the load of the vehicle, avoiding the problems involved in mechanical transmission means between sprung components and non-sprung components of the vehicle, as is well known to those skilled in the art.

The invention will now be described with reference to the accompanying drawings in which:

FIG. 1 is a view in longitudinal section of a braking correcting valve according to the invention, and FIG. 2 is a view of the correcting valve shown in FIG. 1, in partial section taken along line II—II in FIG. 1.

Referring firstly to FIG. 1, a correcting valve 10 for a dual braking circuit comprises a body 12 which is closed at its upper part by a cover 14 and in which there are provided two identical stepped bores 16 and 116 with parallel axes XX or X'X', with a general axis of symmetry YY. Each bore 16 and 116 comprises a small-diameter portion 15 and 115 and a large-diameter portion 17 and 117 which is closed by a plug member 18 and 118 comprising a pin 20 and 120, the purpose of which will be described hereinafter. Mounted in each bore 16 and 116 is a stepped piston or spool 22 and 122 whose small-diameter portion 21 and 121 is slideable in the small-diameter portion 13 and 113 of the bore and whose large-diameter portion 23 and 123 is slideable in the medium-diameter portion 15 and 115 of the bore. The piston 22 and 122 define with the bore 16 and 116, on the one hand, between its portions 21, 121 and 23, 123, a first chamber referred to as the inlet chamber 24 and 124 and, on the other hand, between the portion 23 and 123 and the plug member 18 and 118, a second chamber referred to as the outlet chamber 26 and 126. The inlet chamber 24 and 124 is connected by way of an inlet ports 28 and 128 to an independent hydraulic braking pressure source (not shown), and the outlet chamber 26 and 126 is connected by way of an outlet port 30 and 130 to a set of brake actuators of the vehicle (also not shown). The independent pressure sources are formed, by way of example, by a conventional tandem master-cylinder of any known type.

The piston 22 and 122 has a passage 32 and 132 comprising an axial portion and a radial portion, while a ball-type valve 34 and 134 comprising an annular seat 31 and 131, a ball 33 and 133 and a spring 35 and 135 is disposed in the passage 32 and 132.

Finally, the upper end portion 36 and 136 of the piston 22 and 122 projects into a cavity 38 provided in the upper part of the body 12 which is closed by the cover 14.

The cover 14 is provided with two parallel blind bores 40 and 140 in which two identical thrust members 42 and 142 are slideable. With the blind bores, the two thrust members define two actuating chambers 44 and 144 which are connected to each other by way of a passage 46 which opens into a port 48 connected to the hydraulic suspension system of the vehicle (not shown) in such a way that the pressure $P_h$ prevailing in the two chambers 44 and 144 is representative of the load carried by the rear axle of the vehicle.

At their lower end portions, the thrust members 42 and 142 comprise reduced-diameter extensions 50 and 150, the ends 52 and 152 thereof being in contact with the end portions 36 and 136 of the pistons 22 and 122.

Disposed in the cavity 38 are two reaction springs 51 and 151 which are trapped between an abutment plate 53 and two transmission members 55 and 155 respectively. The latter are substantially in the form of two sheaths or sleeves which are disposed around the extensions 50 and 51 of the thrust members 42 and 142 and which abut against shoulders 58 and 158 provided on the thrust members. The transmission member 55 comprises two annular radial projections 54 and 56 which are axially separated, while the transmission member 155 comprises an annular radial projection 57 which projects between the radial projections 54 and 56.

Finally, the axial position of the plate 53 can be adjusted in the following manner: the plate is mounted pivotally with respect to the two arms 60 and 160 of a stirrup-like member 62 (see FIG. 2), the axis of the pivotal movement being disposed between the plate 53 and the transmission member 55 and 155, and a connecting means of controllable length is provided between the stirrup-like member 62 and the cover 14, the connecting means comprising a rod 64 which is fixed to the stirrup-like member 62 and which passes through the cover 14, and a nut 66 which is screwed onto the screw-threaded end portion 68 of the rod 64. The stirrup-like member also comprises a cylindrical projection 70 which is engaged into a hole 72 in the cover 14, this arrangement preventing any rotary movement of the stirrup-like member 62 and the plate 53 about the axis of symmetry YY.

The cover 14, the chambers 44 and 144 and the thrust members 42 and 142 constitute dividing means intended to divide an actuating force into two actuating half-forces which are each applied to a respective one of the thrust members 42 and 142.

In addition, the assembly combining the dividing means, the reaction springs 51 and 151, the abutment plate 53 and the transmission members 55 and 155 forms a distributor assembly which is capable of generating, from the above-mentioned actuating force, two pilot forces for urging the two pistons 22 and 122 in a direction tending to cause the ball-type valves 34 and 134 to open, as will be apparent from the following description of the mode of operation of the above-described correcting valve.

If it is assumed that the vehicle is stationary, and in the absence of any braking action, a low residual pressure prevails at the inlet ports 28 and 128 and at the outlet ports 30 and 130. The pressure $P_h$ prevailing in the hydraulic suspension unit is transmitted to the port 48 and, by way of the passage 46, to the actuating chambers 44 and 144. This pressure which is referred to as actuating or control pressure applies to the thrust members 42 and 142 an actuating force $F_c$ which is divided into two actuating half-forces $F_c/2$ which are directed downwardly as looking at FIG. 1. The assembly comprising the actuating chambers and the thrust members forms dividing means for dividing the actuating forces into two equal actuating half-forces $F_c/2$ which urge the pistons 22 and 122 into a position of abutment against the plug members 18 and 118 so that the pins 20 and 120 lift the balls 33 and 133 from their seats 31 and 131.

Moreover, the springs 51 and 151 apply two equal return forces R to the transmission members 55 and 155 and consequently to the thrust members 42 and 142 therefore apply two equal pilot forces $F_p$ to the pistons 22 and 122.

When a normal braking action is produced, substantially equal inlet pressures prevail at the ports 28 and 128. As the valves 34 and 134 are open, these inlet pressures are transmitted to the outlet ports 30 and 130 so that consequently the pressures prevailing at the outlet ports are substantially equal to each other and equal to the inlet pressures. Accordingly, the pistons 22 and 122 are subjected to upwardly directed forces.

As long as these forces are lower than the pilot forces $F_p$, the two pistons remain stationary, the valves 34 and 134 remain open and the outlet pressures remain equal to the inlet pressures.

In contrast, when the inlet pressures reach a "cut-off" pressure $P_c$, the pistons 22 and 122 are then capable of being simultaneously displaced upwardly, causing the ball-type valves 34 and 134 to close. When the inlet pressures exceed the cut-off value $P_c$, the outlet pressures are tailored so that the increase in the outlet pressure is proportionally less than that in the inlet pressure, this occurring in an identical manner for both circuits, as is well known in the art.

It will be apparent that, in an alternative form of the invention, it is possible to use pistons of constant cross-sectional area, in which case this modified form of the invention operates as a simple pressure-limiting valve, the outlet pressure then being limited to a fixed value for a given load vehicle.

It will be noted that the cut-off pressure $P_c$ depends on the one hand on the adjustment of the reaction force R by virtue of the assembly comprising the rod 64 and the nut 66, and on the other hand, on the load on the vehicle; in fact, as the pressure $P_h$ is directly linked to the load on the vehicle, this also applies in regard to the actuating force $F_c$.

In the event of failure of one of the braking circuits, the above-described apparatus operates in the following manner:

It will be assumed that for example there is no inlet pressure at the port 128. As long as the inlet pressure at the port 28 remains lower than $P_c$, the piston 22 remains stationary and the components of the apparatus occupy the positions that they normally occupy at rest and the outlet pressure at the port 30 is equal to the inlet pressure, as before.

In contrast, when the inlet pressure reaches the value $P_c$, the piston 22 begins to move upwardly while the piston 122 remains stationary, in a position of abutment against the plug member 118. Before the valve 34 is closed, the annular radial projection 54 of the transmission member 55 comes into engagement with the radial projection 57 of the transmission member 155. Consequently, the pilot force $F_p$ that the thrust member 142 previously applied to the piston 122 is then transmitted to the thrust member 42 which then applies a doubled pilot force, $2 \times F_p$, to the piston 22.

The piston 22 can therefore no longer be displaced upwardly until pressure reaches a new value $P'_c$ which is double $P_c$, and the outlet pressure remains equal to the inlet pressure. It is only when the pressure reaches the value $P'_c$ that the piston can again move upwardly and the outlet pressure undergoes a limitation effect by actuation of the valve 34, as already explained. In the event of failure of the other braking circuit, the system operates in a symmetrical manner.

To summarize with, in the event of failure of one of the braking circuits, the correcting valve according to the invention makes it possible to double the cut-off pressure in the circuit which is still intact, and consequently to increase the braking capacity of the rear wheel which is supplied with fluid by that circuit.

In modified forms of the invention, which are not shown in the drawing, the pressure $P_h$ can be produced by means of any generator which is sensitive to the load on the vehicle.

It may also be noted that the pressure $P_h$ may be a fixed pressure, in which case the characteristics of the correcting means are independent of the load on the vehicle.

Moreover, the actuating force $F_c$ and the actuating half-force $F_c/2$ can be produced by a mechanical system which may or may not be controlled by the load on the vehicle, in particular two springs which are mounted in parallel and which act separately on each thrust member.

We claim:

1. A braking correcting valve for a motor vehicle dual braking circuit comprising: a body, two parallel bores in said body defining between them an axis of symmetry, each of said bores communicating with a corresponding inlet port and outlet port, two pistons slidable in said bores, controlling the flow of a pressure fluid between one of said inlet ports and the outlet port corresponding thereto, each of said pistons having an end portion which projects outwardly of said body, and a distributor assembly which is capable of generating, from an actuating force, two pilot forces acting on said end portions to urge the pistons inwardly of the body in the direction of establishing said flow of fluid, said pressure fluid urging the pistons outwardly of the body in the direction of interrupting the flow of fluid, characterized in that said distributor assembly comprises: a cover which is fixed with respect to said body, two thrust members which are slidable in said cover parallel to said pistons and capable of coming into abutment with the end portions of said pistons, said actuating force being divided into two equal actuating half-forces which are each applied to one of the two thrust members for urging said pistons inwardly of said body, resilient means for producing a reaction force opposed to said actuating half-forces, and a transmission assembly for distributing said reaction force in the form of two reaction half-forces each applied to one of said thrust members, whereby each thrust member is subjected to opposite forces defining an actuating half-force, and a reaction half-force, the resultant of which constitutes said pilot force, said transmission assembly comprising two transmission elements which are fixed with respect to each of said thrust members, one of said transmission elements comprising two axially separated radial projections and the other said transmission elements comprising a radial projection which projects between the radial projections of the first transmission element and being capable of coming into engagement with one of said two radial projections when the relative axial displacement between the two pistons exceeds a predetermined value.

2. A braking correcting valve according to claim 1, wherein the actuating force is generated by an actuating pressure, characterized in that an actuating chamber is defined in said cover to receive the actuating pressure, said thrust members sealingly projecting into said actuating chamber.

3. A braking correcting valve according to claim 2 for a vehicle comprising a hydraulic suspension circuit, characterized in that said actuating pressure is a pressure from said hydraulic suspension circuit.

4. A breaking correcting valve according to anyone of claims 1 to 3, characterised in that said resilient means comprise two reaction springs which are compressed between an abutment plate and respective ones of said transmission elements, said springs producing on said transmission elements two reaction half-forces, the resultant of which is coaxial with the axis of symmetry.

5. A braking correcting valve according to claim 4 characterised in that said abutment plate comprises adjustable axial positioning means comprising a U-shaped stirrup-like member, said abutment plate being mounted pivotally with respect to the arms of said stirrup-like member, a connecting means of adjustable length being provided between said stirrup-like member and said cover.

6. A braking correcting valve according to claim 4 characterized in that said thrust members each comprise a large-diameter portion and a reduced-diameter extension portion which are separated by a flat shoulder, said transmission elements being substantially in the form of sheaths disposed around said reduced-diameter extension portions and bearing against said flat shoulders.

7. A braking correcting valve according to claim 5 characterized in that said thrust members each comprise a large-diameter portion and a reduced-diameter extension portion which are separated by a flat shoulder, said transmission elements being substantially in the form of sheaths disposed around said reduced-diameter extension portions and bearing against said flat shoulders.

* * * * *